United States Patent [19]
Klimek et al.

[11] Patent Number: 5,559,964
[45] Date of Patent: Sep. 24, 1996

[54] CABLE CONNECTOR KEYING

[75] Inventors: John R. Klimek, Cupertino; David Weiss, Palo Alto, both of Calif.

[73] Assignee: Rolm Company, Santa Clara, Calif.

[21] Appl. No.: 293,103

[22] Filed: Aug. 19, 1994

Related U.S. Application Data

[63] Continuation of Ser. No. 990,738, Dec. 15, 1992, abandoned.

[51] Int. Cl.⁶ .................................................. G06F 13/00
[52] U.S. Cl. ............................................ 395/280; 439/46
[58] Field of Search ..................................... 395/325, 800, 395/280; 439/45, 46, 49

[56] References Cited

U.S. PATENT DOCUMENTS

| | | | |
|---|---|---|---|
| 4,168,796 | 9/1979 | Fulks et al. | 371/22.6 |
| 4,471,158 | 9/1984 | Roberts | 174/52.4 |
| 4,508,399 | 4/1985 | Dowling et al. | 439/67 |
| 5,203,004 | 4/1993 | Bunton et al. | 395/800 |

*Primary Examiner*—Jack B. Harvey
*Assistant Examiner*—Glenn A. Auve

[57] ABSTRACT

A cable connector having pins reserved for conveying data through shorting can be used to automatically convey pertinent information concerning the cable, the system to which the cable is connected, whether the cable is attached at all, or any combination of the above, to the adjoining component. Such information can be modified at will by changing the pins which are shorted.

14 Claims, 2 Drawing Sheets

5,559,964

CABLE CONNECTOR KEYING

CROSS-REFERENCE TO RELATED APPLICATION

This is a continuation of Ser. No. 07/990,738 filed on Dec. 15, 1992, now abandoned.

FIELD OF THE INVENTION

This invention generally relates to the interconnection of components in electronic systems. Specifically, the invention is directed to an apparatus and method for conveying information about the interconnected components and the interconnecting cables using a coding system integral with the cables.

BACKGROUND OF THE INVENTION

In many hardware systems, the components are modular and may be interconnected by a variety of cables. Moreover, the systems may permit interconnection of more than one type of module to another. For example, an interconnected module may supply data in a serial mode at one of several data rates, e.g., 2 kbps, 4 kbps, etc. The receiving module will need to know that rate in order to properly receive such data. Also, where cable length is critical, due to response and delay times, interconnected modules would need to be able to compensate for the actual length.

Data rates, cable lengths, and virtually any other information—e.g., about the cable, the system(s) to which it is attached, whether the cable is attached at all, or any combination of the above—could be conveyed to the receiving module in several ways. The software in the receiving module could have a switch set to the proper rate. Alternatively, the information could be programmed in an EPROM or some other suitable memory. Another method would be to use manually-configured jumpers on a circuit board.

While these methods would achieve the desired result, they require that the user provide documentation supporting the selected method of conveying the information. Also, service personnel would need additional training in order to maintain and adjust such systems. EPROM-based methods would require dedication of RAM or other active memory and the software to retrieve and utilize the data in the EPROM. If a software switch is used, then there would be added software maintenance.

Thus, it would be helpful to provide a way of communicating information without having to physically program a module or an EPROM, or manipulate jumpers. Ideally, the information would be conveyed in an automatic but transparent manner.

SUMMARY OF THE INVENTION

These and other objects are achieved by a keyed cable that automatically conveys the specific information. The programming occurs during the manufacture or installation of the cable, and the information transfer occurs when the cable is plugged into the system. Because the information is integral with the cable, technicians need not be aware of the details.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
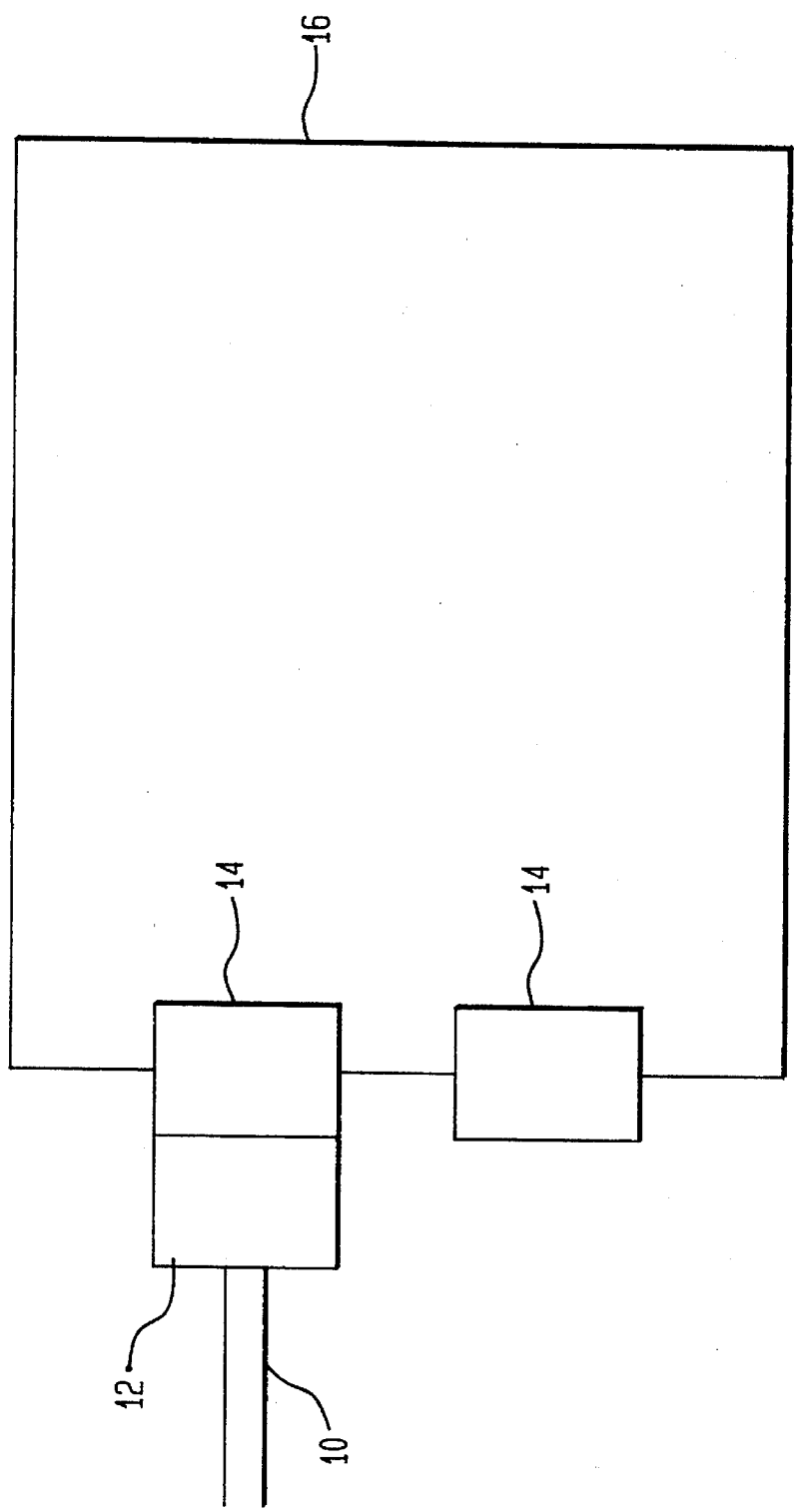
FIG. 1 is an illustration of a circuit board having connector sockets to which a cable may be attached.

As illustrated in FIG. 1, the cable 10 is attached to a cable connector 12 that mates with a connector socket 14 on the circuit board 16. Any type of connector could be used; the drawing in FIG. 1 suggests one of many possibilities.

Figure 2:
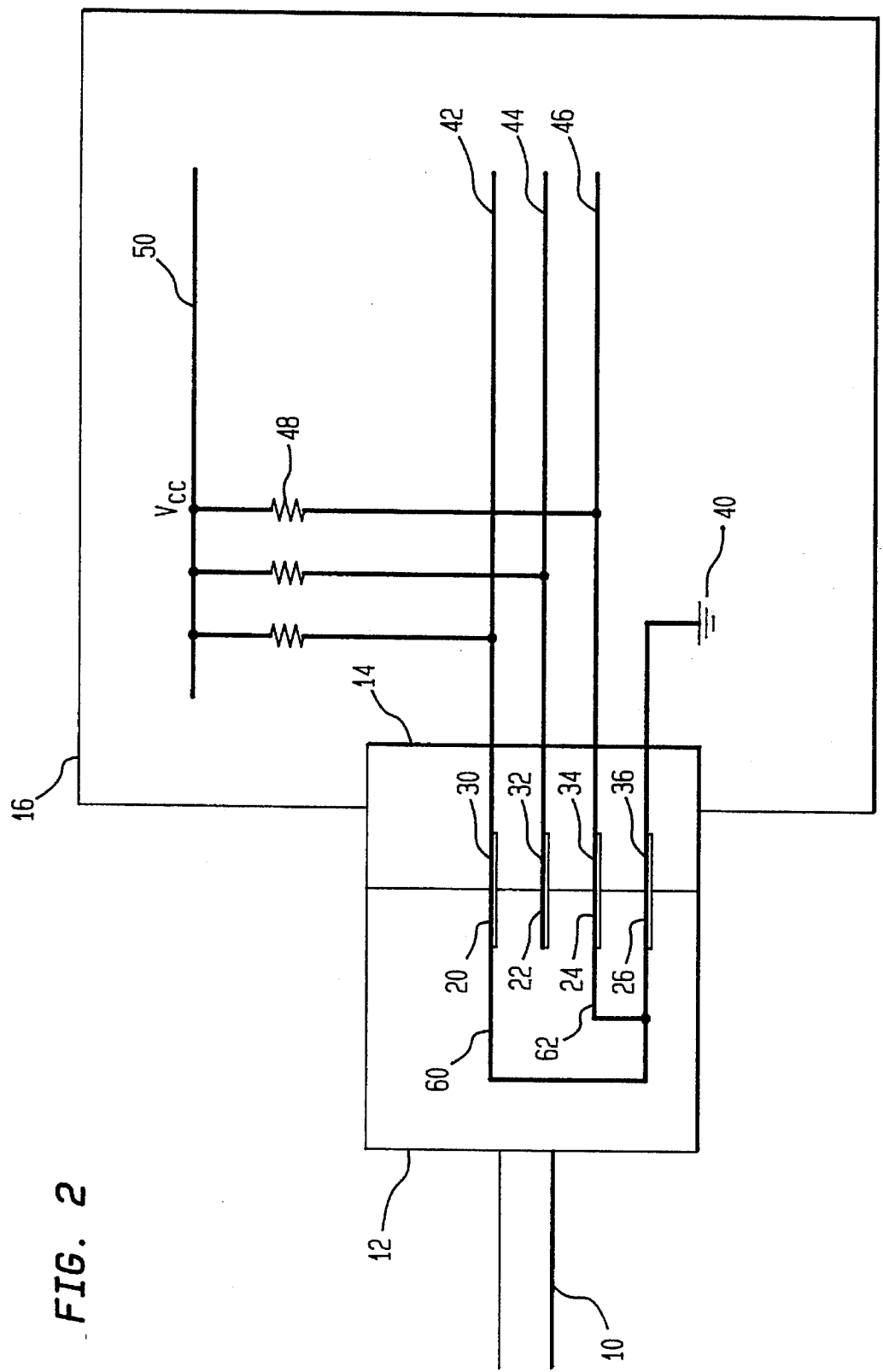
FIG. 2 is a schematic diagram of the cable connector, the connector socket, and a portion of the circuit board.

The cable connector 12, the connector socket 14, and a portion of the circuit board 16 are shown schematically in FIG. 2. In addition to any m functional pins not illustrated here, the cable connector 12 has four pins 20, 22, 24, and 26. Correspondingly, the connector socket 14 has four additional pins 30, 32, 34, and 36. The number four is arbitrary and used for illustration purposes only; one would provide n+1 additional pins for the number of n binary items that may convey up to $2^n$ combinatorial code words by the connector. The number 1 in the expression n+1 can be any number greater than or equal to 1. The four pins will provide up to 8 code words of three bits each. The other m pins would carry data or other functional information conveyed through the cable 10.

On the board side, one pin 36 is connected to ground 40. The remaining three pins 30, 32, and 34 are connected to key lines 42, 44, and 46. Each of the key lines 42, 44, and 46 are connected to a pull-up resistor 48, connected to voltage $V_{CC}$ 50.

As shown in FIG. 2, pins 20 and 24 are connected by wires 60 and 62, respectively, to pin 26. Before the cable connector 12 is inserted into the connector socket 14, the key lines 42, 44, and 46 are all sitting at $V_{CC}$. The binary code word 111 can conveniently be used to automatically detect that a cable is not connected at all. When the connector 12 is inserted into the connector socket 14 as illustrated in FIG. 2, one path is created from key line 42 through pin 30, pin 20, wire 60, pin 26, and pin 36 to ground 40. Similarly, another path is created from key line 46 through pin 34, pin 24, wire 62, pin 26, and pin 36 to ground 40. Now, key lines 42 and 46 are at ground potential and only key line 44 remains at $V_{cc}$. The information thus conveyed is 010. By changing the arrangement of the wires, either adding or subtracting them, the information would likewise be changed.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, the device could employ pull-down resistors instead of pull-up resistors, connecting key lines 42, 44, and 46 to ground 40 and pin 36 to $V_{cc}$. Also, one could create independent, isolated paths using additional reference points and sets of interconnecting wires.

What is claimed is:

1. An apparatus for conveying a binary code having a plurality of binary elements to a selectively-mating connector means, comprising:

a plurality of pins;

wire means for selectively connecting a first one of the plurality of pins to at least one of the other of the plurality of pins; and means for selectively mating the first one of the plurality of pins with a pin having a first potential and the other of the plurality of pins with pins having a second potential.

2. An apparatus for receiving a binary code having a plurality of binary elements from a selectively-mating connector means, comprising: a plurality of pins;

means for providing a first potential to one of the plurality of pins, the one pin being referred to as the pin having a first potential;

means for providing a second potential to the other of the plurality of pins, the other of the plurality of pins being referred to as the pins having a second potential; and means for selectively mating the plurality of pins to means for selectively electrically connecting the pin having a first potential to at least one of the pins having a second potential.

3. An apparatus as set forth in claim 2, wherein the means for providing a first potential is ground and the means for providing a second potential is a pull-up.

4. An apparatus as set forth in claim 2, wherein the means for providing a first potential is $V_{CC}$ and the means for providing a second potential is a pull-down.

5. An apparatus for conveying a binary code having a plurality of binary elements between a pair of selectively-mating connector means, comprising:

first connector means having a plurality of pins and wire means for selectively connecting a first one of the plurality of pins to at least one of the other of the plurality of pins; and second connector means for selectively mating with the first connector means, the second connector means having a plurality of pins which mate with the plurality of pins of the first connector, where one pin of the second connector means is connected to means for providing a first potential and mates with the first one of the plurality of pins of the first connector means, and the other of the plurality of pins of the second connector means are connected to means for providing a second potential and mate with the other of the plurality of pins of the first connector means.

6. An apparatus as set forth in claim 5, wherein the means for providing a first potential is ground and the means for providing a second potential is a pull-up.

7. An apparatus as set forth in claim 5, wherein the means for providing a first potential is $V_{CC}$ and the means for providing a second potential is a pull-down.

8. A method of conveying a binary code having a plurality of binary elements to a selectively-mating connector means having a plurality of pins, the method comprising the steps of:

selectively connecting wire means between a first one of the plurality of pins and at least one of the other of the plurality of pins; and selectively mating the first one of the plurality of pins with a pin having a first potential and the other of the plurality of pins with pins having a second potential.

9. A method of receiving a binary code having a plurality of binary elements from a selectively-mating first connector means having a plurality of pins, the method comprising the steps of:

providing a first potential to one of the plurality of pins, the one pin being referred to as the pin having a first potential;

providing a second potential to the other of the plurality of pins, the other of the plurality of pins being referred to as the pins having a second potential; and selectively mating the plurality of pins to means for selectively electrically connecting the pin having a first potential to at least one of the pins having a second potential.

10. A method as set forth in claim 9, wherein the step of providing a first potential includes the substep of connecting the pin having a first potential to ground and the step of providing a second potential includes the substep of connecting the other of the plurality of pins to a pull-up.

11. A method as set forth in claim 9, wherein the step of providing a first potential includes the substep of connecting the pin having a first potential to $V_{CC}$ and the step of providing a second potential includes the substep of connecting the other of the plurality of pins to a pull-down.

12. A method of conveying a binary code having a plurality of binary elements from a first connector means that selectively mates with a second connector means, the first connector means having a plurality of pins and wire means for selectively connecting a first one of the plurality of pins to at least one of the other of the plurality of pins and the second connector means having a plurality of pins that mate with the plurality of pins of the first connector means, the method comprising the steps of:

selectively connecting the wire means between the first one of the plurality of pins to at least one of the other of the plurality of pins of the first connector means;

providing a first potential to one of the plurality of pins of the second connector means, the one pin being referred to as the pin having a first potential;

providing a second potential to the other of the plurality of pins of the second connector means, the other of the plurality of pins being referred to as the pins having a second potential; and selectively mating the first and second connector means.

13. A method as set forth in claim 12, wherein the step of providing a first potential includes the substep of connecting the pin having a first potential to ground and the step of providing a second potential includes the sub step of connecting the other of the plurality of pins to a pull-up.

14. A method as set forth in claim 12, wherein the step of providing a first potential includes the substep of connecting the pin having a first potential to $V_{CC}$ and the step of providing a second potential includes the substep of connecting the other of the plurality of pins to a pull-down.

* * * * *